United States Patent
Jafari Tafti et al.

(10) Patent No.: US 11,242,060 B2
(45) Date of Patent: Feb. 8, 2022

(54) MANEUVER PLANNING FOR URGENT LANE CHANGES

(71) Applicant: GM GLOBAL TECHNOLOGY OPERATIONS LLC, Detroit, MI (US)

(72) Inventors: Sayyed Rouhollah Jafari Tafti, Troy, MI (US); Pinaki Gupta, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 16/551,218

(22) Filed: Aug. 26, 2019

(65) Prior Publication Data

US 2021/0061282 A1   Mar. 4, 2021

(51) Int. Cl.
*B60W 30/18*   (2012.01)
*G05D 1/00*   (2006.01)

(52) U.S. Cl.
CPC ..... *B60W 30/18163* (2013.01); *G05D 1/0088* (2013.01); *B60W 2554/801* (2020.02); *G05D 2201/0213* (2013.01)

(58) Field of Classification Search
CPC ..... B60W 30/18163; B60W 60/00276; B60W 40/00; G05D 1/0088
See application file for complete search history.

(56) References Cited

U.S. PATENT DOCUMENTS

| | | | |
|---|---|---|---|
| 9,092,987 B2 * | 7/2015 | Bone | G08G 1/167 |
| 9,475,491 B1 * | 10/2016 | Nagasaka | B60W 30/18163 |
| 2013/0184926 A1 * | 7/2013 | Spero | B60W 30/18163 701/26 |
| 2015/0142207 A1 * | 5/2015 | Flehmig | G01C 21/3492 701/1 |
| 2015/0194055 A1 * | 7/2015 | Maass | G08G 1/096716 340/905 |
| 2017/0102705 A1 * | 4/2017 | Silvlin | B60W 30/10 |
| 2017/0242435 A1 * | 8/2017 | Nilsson | G08G 1/167 |
| 2020/0307599 A1 * | 10/2020 | Oka | B60W 60/00276 |
| 2020/0331476 A1 * | 10/2020 | Chen | G05D 1/0088 |

FOREIGN PATENT DOCUMENTS

JP   2019-137139   *   8/2019   ............ B60W 40/04

* cited by examiner

*Primary Examiner* — Michael J Zanelli
(74) *Attorney, Agent, or Firm* — Lorenz & Kopf LLP

(57) ABSTRACT

In various embodiments, methods, systems, and vehicles are provided for executing a lane change for a host vehicle. In various embodiments, one or more sensors obtain sensor data pertaining to target vehicles in proximity to the host vehicle; and a processor at least facilitates: obtaining, using the sensor data, predictions as to future positions and movement of the target vehicle; identifying a plurality of gaps through which the host vehicle may accomplish the lane change, based on the predictions; calculating a cost for each of the plurality of gaps; selecting, a selected gap of the plurality of gaps, having a minimized cost; and executing the lane change for the host vehicle via the selected gap.

17 Claims, 7 Drawing Sheets

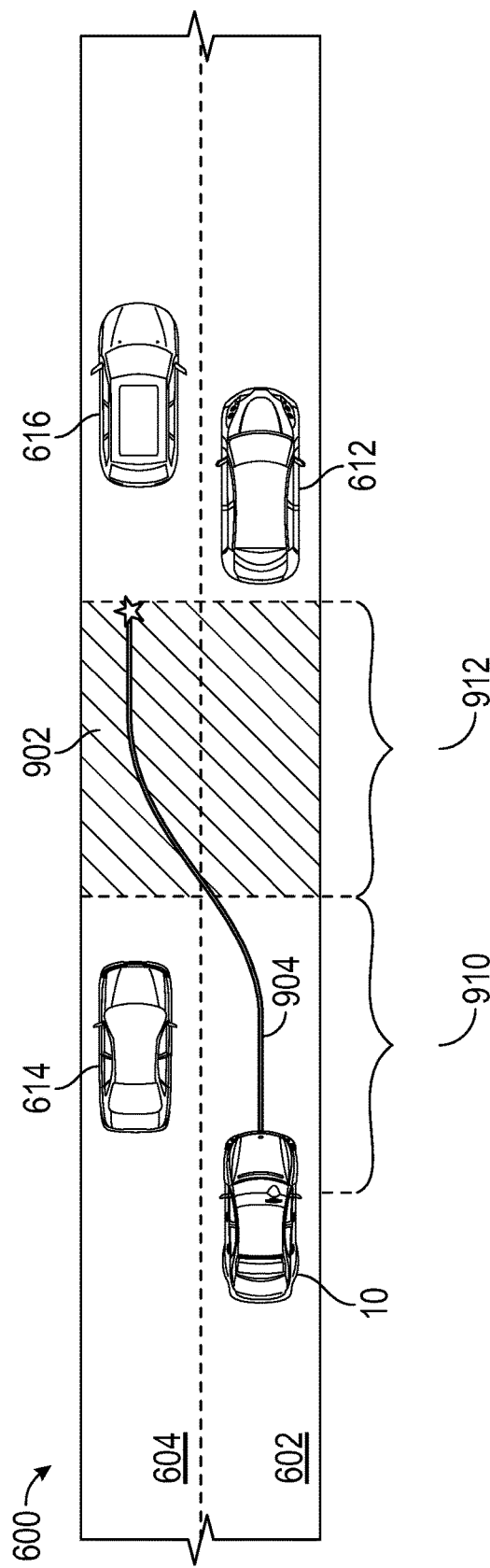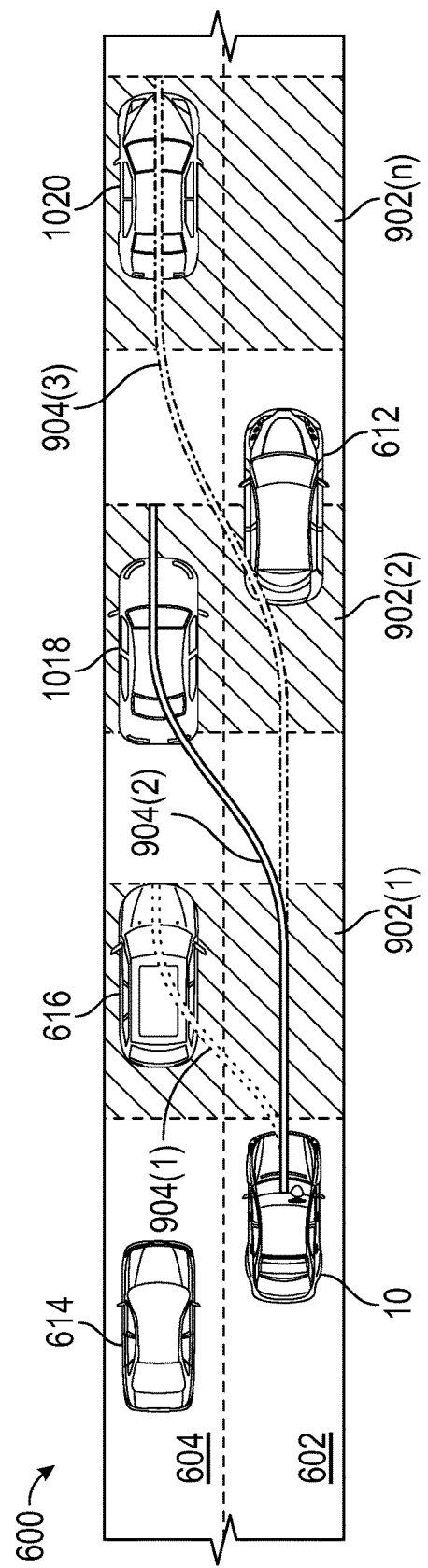
FIG. 9
FIG. 10

MANEUVER PLANNING FOR URGENT LANE CHANGES

TECHNICAL FIELD

The present disclosure generally relates to vehicles, and more particularly relates to systems and methods for planning an urgent lane change maneuver.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While autonomous vehicles offer many potential advantages over traditional vehicles, in certain circumstances it may be desirable for improved movement of autonomous vehicles, for example in planning an urgent lane change.

Accordingly, it is desirable to provide systems and methods for operation of vehicles, such as autonomous vehicles, including planning an urgent lane change for a vehicle. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method for executing a lane change for a host vehicle includes: obtaining, via one or more sensors, sensor data pertaining to target vehicles in proximity to the host vehicle; obtaining, via a processor using the sensor data, predictions as to future positions and movement of the target vehicle; identifying, via the processor, a plurality of gaps through which the host vehicle may accomplish the lane change, based on the predictions; calculating, via the processor, a cost for each of the plurality of gaps; selecting, via the processor, a selected gap of the plurality of gaps, having a minimized cost; and executing the lane change for the host vehicle via the selected gap, via instructions provided by the processor.

Also in an embodiment, the method further includes: obtaining map data pertaining to a roadway on which the host vehicle is travelling; and determining, via the processor using the map data, whether the lane change is to be performed within a predetermined amount of time; wherein the steps of identifying the plurality of gaps, calculating the cost, selecting the optimal gap, and executing the lane change are performed only on a further condition that the lane change is determined to be performed within the predetermined amount of time.

Also in an embodiment, the method further includes: determining, via the processor, for each of the current gaps, a respective trajectory for the host vehicle to travel to execute the lane change; wherein: the step of calculating the cost for each of the current gaps includes calculating a respective cost for each trajectory of the current gaps; the step of selecting the optimal gap includes selecting an optimal trajectory for one of the current gaps, having the minimized cost; and the step of executing the lane change includes executing the optimal trajectory for the host vehicle, via instructions provided by the processor.

Also in an embodiment, the method further includes: determining, via the processor, for each of the plurality of predicted gaps, an optimized time for execution of the lane change utilizing the predicted gap that maximizes a size of the gap, subject to a minimum gap size for lane change and a corresponding minimum time and maximum time for the lane change; wherein the step of determining the respective trajectory includes, for each of the plurality of respective gaps, determining the respective trajectory that executes the lane change using the gap at the optimized time for that gap.

Also in an embodiment, the method further includes, for each of the current gaps and its corresponding trajectory: dividing the trajectory into a lane keeping component and a lane changing component; and calculating a total cost for the trajectory to include respective costs of both the lane keeping component and the lane changing component; wherein the step of selecting the optimal trajectory is based on minimizing the total cost.

Also in an embodiment, the step of calculating the cost for each trajectory includes calculating the cost based on a measure of aggressiveness of the maneuver, an amount of time to reach the desired lane, and a closest distance to other vehicles during an entirety of the maneuver.

Also in an embodiment, the measure of aggressiveness includes measures of lateral acceleration, longitudinal acceleration, lateral jerk, and longitudinal jerk.

Also in an embodiment, the method is implemented in an autonomous vehicle.

In another exemplary embodiment, a system is provided that includes: (i) one or more sensors configured to obtain sensor data pertaining to target vehicles in proximity to a host vehicle; and (ii) a processor coupled to the one or more sensors and configured to at least facilitate: obtaining predictions as to future positions and movement of the target vehicle; identifying a plurality of gaps through which the host vehicle may accomplish the lane change, based on the predictions; calculating a cost for each of the current gaps; selecting an optimal gap, having a minimized cost; and providing instructions for executing the lane change for the host vehicle.

Also in one embodiment, the processor is further configured to at least facilitate: obtaining map data pertaining to a roadway on which the host vehicle is travelling; determining, using the map data, whether the lane change is to be performed within a predetermined amount of time; and calculating the cost, selecting the optimal gap, and executing the lane change only on further conditions that the lane change is determined to be performed within the predetermined amount of time.

Also in one embodiment, the processor is further configured to at least facilitate: determining, for each of the potential gaps, a respective trajectory for the host vehicle to travel to execute the lane change; calculating a respective cost for each trajectory of a current gap; selecting an optimal trajectory for one of the current gaps, having the minimized cost; and providing instructions for executing the optimal trajectory for the host vehicle.

Also in one embodiment, wherein the processor is further configured to at least facilitate: determining, for each of the current gaps, an optimal time for execution of the lane change utilizing the gap that maximizes a size of the predicted gap, subject to a minimum gap size for lane change and a corresponding minimum time and maximum time for the lane change; and for each of the plurality of respective gaps, selecting the respective trajectory that executes the lane change using the gap at the optimized time for that gap Also in one embodiment, the processor is further configured to at least facilitate: (i) for each of the current gaps and its corresponding trajectory: (a) dividing the trajectory into a lane keeping component and a lane changing component; and (b) calculating a total cost for the trajectory to include respective costs of both the lane keeping component and the lane changing component; and (ii) selecting the optimal trajectory is based on minimizing the total cost.

Also in one embodiment, the processor is further configured to at least facilitate calculating the cost based on a measure of aggressiveness of the maneuver, an amount of time to reach the desired lane, and a closest distance to other vehicles during an entirety of the maneuver.

In another exemplary embodiment, an autonomous vehicle includes: (i) one or more sensors configured to obtain sensor data pertaining to target vehicles in proximity to the autonomous vehicle; (ii) a processor coupled to the one or more sensors and configured to at least facilitate: (a) obtaining predictions as to future positions and movement of the target vehicle; (b) identifying a plurality of gaps through which the autonomous vehicle may accomplish the lane change, based on the predictions; (c) calculating a cost for each of the current gaps; (d) selecting an optimal gap, having a minimized cost; and (e) providing instructions for executing the lane change for the autonomous vehicle; and (iii) a vehicle actuator system coupled to the processor and configured to implement the lane change in accordance with the instructions provided by the processor.

Also in one embodiment, the processor is further configured to at least facilitate: obtaining map data pertaining to a roadway on which the autonomous vehicle is travelling; determining, using the map data, whether the lane change is to be performed within a predetermined amount of time; and calculating the cost, selecting the selected gap, and executing the lane change only on further conditions that the lane change is determined to be performed within the predetermined amount of time.

Also in one embodiment, the processor is further configured to at least facilitate: determining, for each of the current gaps, a respective trajectory for the autonomous vehicle to travel to execute the lane change; calculating a respective cost for each trajectory; selecting an optimal trajectory for one of the current gaps, having the minimized cost; and providing instructions to the actuator system for executing the selected trajectory for the autonomous vehicle.

Also in one embodiment, the processor is further configured to at least facilitate: determining, for each of the current gaps, an optimal time for execution of the lane change utilizing the gap that maximizes a size of the gap, subject to a minimum gap size for lane change and a corresponding minimum time and maximum time for the lane change; and for each of the current gaps, selecting the respective trajectory that executes the lane change using the gap at the optimized time for that gap.

Also in one embodiment, the processor is further configured to at least facilitate: (i) for each of the current gaps and its corresponding trajectory: (a) dividing the trajectory into a lane keeping component and a lane changing component; and (b) calculating a total cost for the trajectory to include respective costs of both the lane keeping component and the lane changing component; and (ii) selecting the selected trajectory is based on minimizing the total cost.

Also in one embodiment, wherein the processor is further configured to at least facilitate calculating the cost based on a measure of aggressiveness of the maneuver, an amount of time to reach the desired lane, and a closest distance to other vehicles during an entirety of the maneuver.

DESCRIPTION OF THE DRAWINGS

The exemplary embodiments will hereinafter be described in conjunction with the following drawing figures, wherein like numerals denote like elements, and wherein:

FIGS. 9 and 10 are schematic diagrams showing the determination of an optimal gap for executing the urgent lane change for the vehicle of FIG. 1 and the roadway of FIG. 6, and utilizing the optimal time of FIGS. 7 and 8, in accordance with exemplary embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
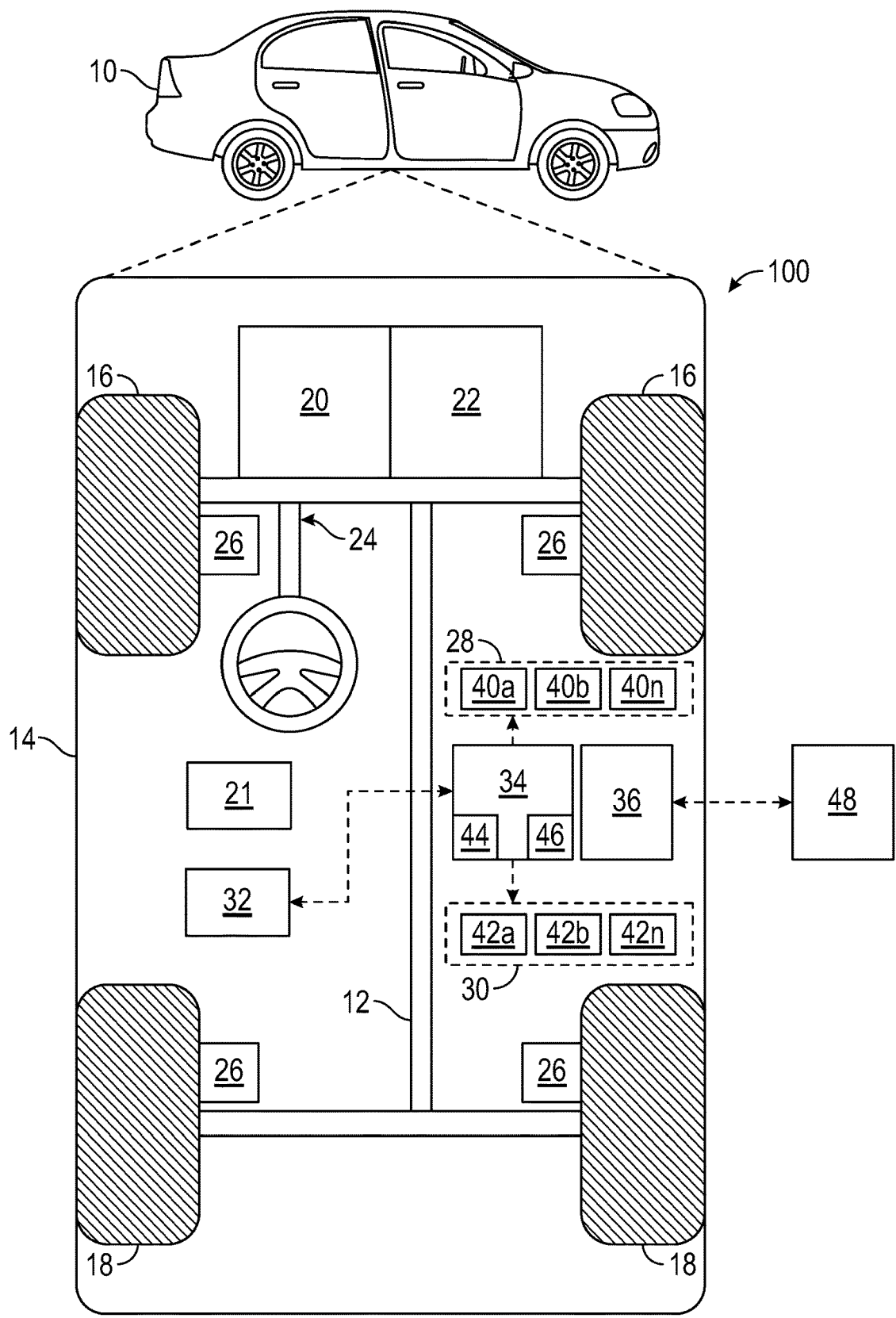
FIG. 1 is a functional block diagram illustrating a vehicle having a lane change planning system, in accordance with various embodiments.

With reference to FIG. 1, a lane change planning system shown generally as 100 is associated with a vehicle 10 (also referred to herein as a "host vehicle") in accordance with various embodiments. In general, the lane change planning system (or simply "system") 100 provides planning for a corridor of travel for the vehicle 10 through a roadway that is shared with other vehicles (e.g., which may be referred to as "other vehicles" or "target vehicles" herein). For example, in various embodiments, the vehicle 10 determines when an urgent lane change is necessary, and plans an optimal execution of the urgent lane change based on detected target vehicles along the roadway.

As described in greater detail further below, an urgent lane change includes a situation in which an imminent lane change is needed for the vehicle 10 to maintain its intended course of travel, such as when the vehicle 10 is approaching a freeway exit and is not presently in an exit lane, and/or when a current lane of travel for the vehicle 10 is ending and the vehicle 10 needs to merge into another lane, in a dense traffic environment. Also as described in greater detail below, the vehicle 10 selects an optimal lane change time (having an associated lane change gap) based on a simulation of the vehicle's environment at multiple points in time and an analysis of costs of different potential lane change gaps for the urgent lane change for the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 comprise a wheel assembly that also includes respective associated tires.

In various embodiments, the vehicle 10 is an autonomous vehicle, and the lane change planning system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous, non-autonomous, or other vehicle that includes sensors and a suspension system.

As shown, the vehicle 10 generally includes a propulsion system 20, a transmission system 22, a steering system 24, a brake system 26, one or more user input devices 21, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel for illustrative purposes, in some embodiments contemplated within the scope of the present disclosure, the steering system 24 may not include a steering wheel.

In various embodiments, one or more user input devices 21 receive inputs from one or more passengers of the vehicle 10. In various embodiments, the inputs include a desired destination of travel for the vehicle 10. In certain embodiments, one or more input devices 27 comprise an interactive touch-screen in the vehicle 10. In certain embodiments, one or more inputs devices 21 comprise a speaker for receiving audio information from the passengers. In certain other embodiments, one or more input devices 21 may comprise one or more other types of devices and/or may be coupled to a user device (e.g., smart phone and/or other electronic device) of the passengers, such as the user device 54 depicted in FIG. 2 and described further below in connection therewith).

The sensor system 28 includes one or more sensors 40a-40n that sense observable conditions of the exterior environment and/or the interior environment of the vehicle 10. The sensors 40a-40n include, but are not limited to, radars, lidars, global positioning systems, optical cameras, thermal cameras, ultrasonic sensors, inertial measurement units, and/or other sensors.

The actuator system 30 includes one or more actuators 42a-42n that control one or more vehicle features such as, but not limited to, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Figure 2:
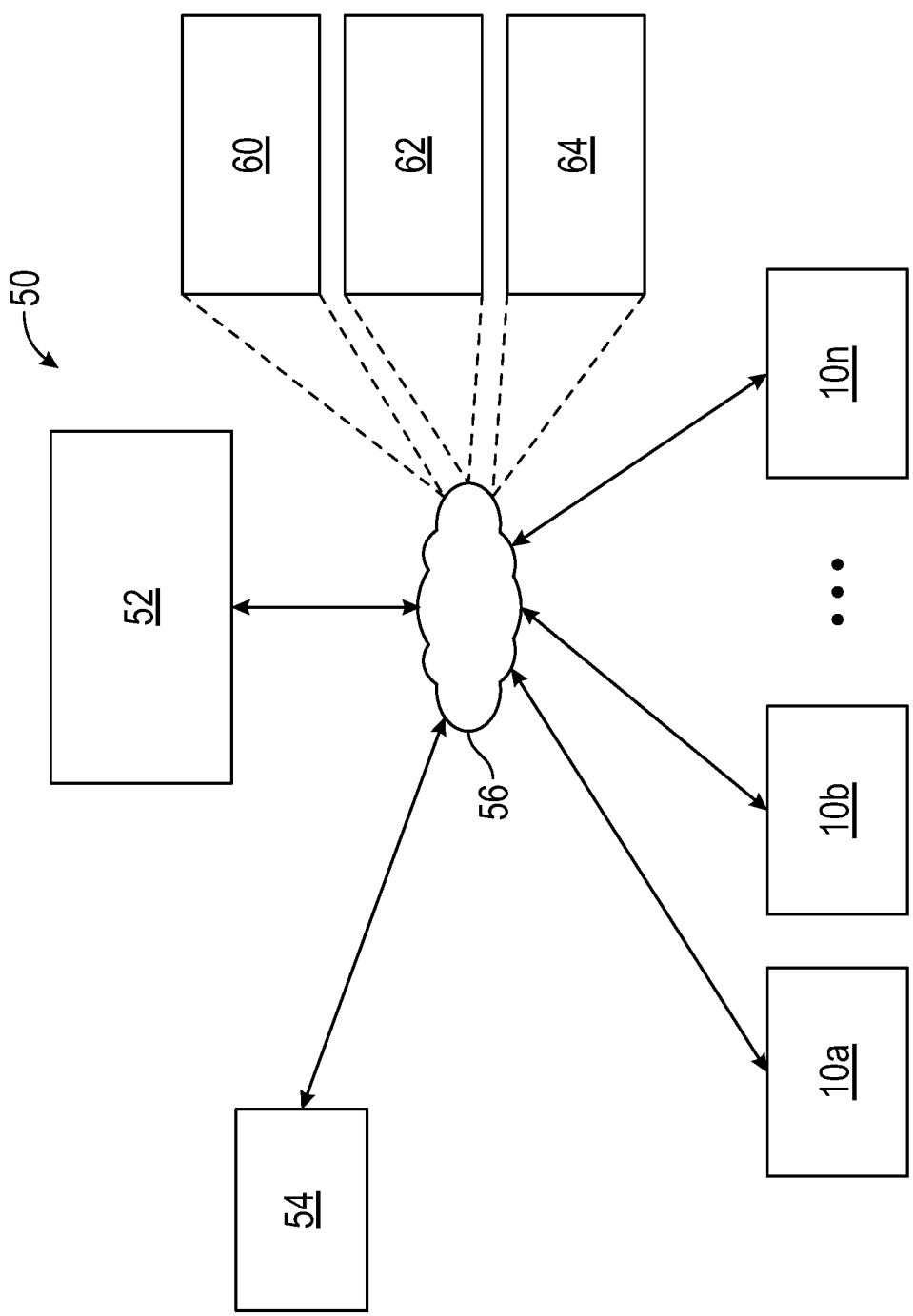
FIG. 2 is a functional block diagram illustrating a transportation system having one or more vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In certain embodiments, the communication system 36 is further configured for communication between the sensor system 28, the input device 21, the actuator system 30, one or more controllers (e.g., the controller 34), and/or more other systems and/or devices (such as, by way of example, the user device 54 depicted in FIG. 2 and described further below in connection therewith). For example, the communication system 36 may include any combination of a controller area network (CAN) bus and/or direct wiring between the sensor system 28, the actuator system 30, one or more controllers 34, and/or one or more other systems and/or devices. In various embodiments, the communication system 36 may include one or more transceivers for communicating with one or more devices and/or systems of the vehicle 10, devices of the passengers (e.g., the user device 54 of FIG. 2), and/or one or more sources of remote information (e.g., GPS data, traffic information, weather information, and so on).

With reference now to FIG. 2, in various embodiments, the vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more vehicles 10a-10n as described with regard to FIG. 1. In various embodiments, the operating environment 50 (all or a part of which may correspond to entities 48 shown in FIG. 1) further includes one or more user devices 54 that communicate with the vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide unidirectional or bi-directional communication with the vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the vehicles 10a-10n to schedule rides, dispatch vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline vehicle 10 and/or a vehicle based remote transportation system 52. To this end, a vehicle and vehicle based remote transportation system can be modified, enhanced, or otherwise supplemented to provide the additional features described in more detail below.

Figure 3:
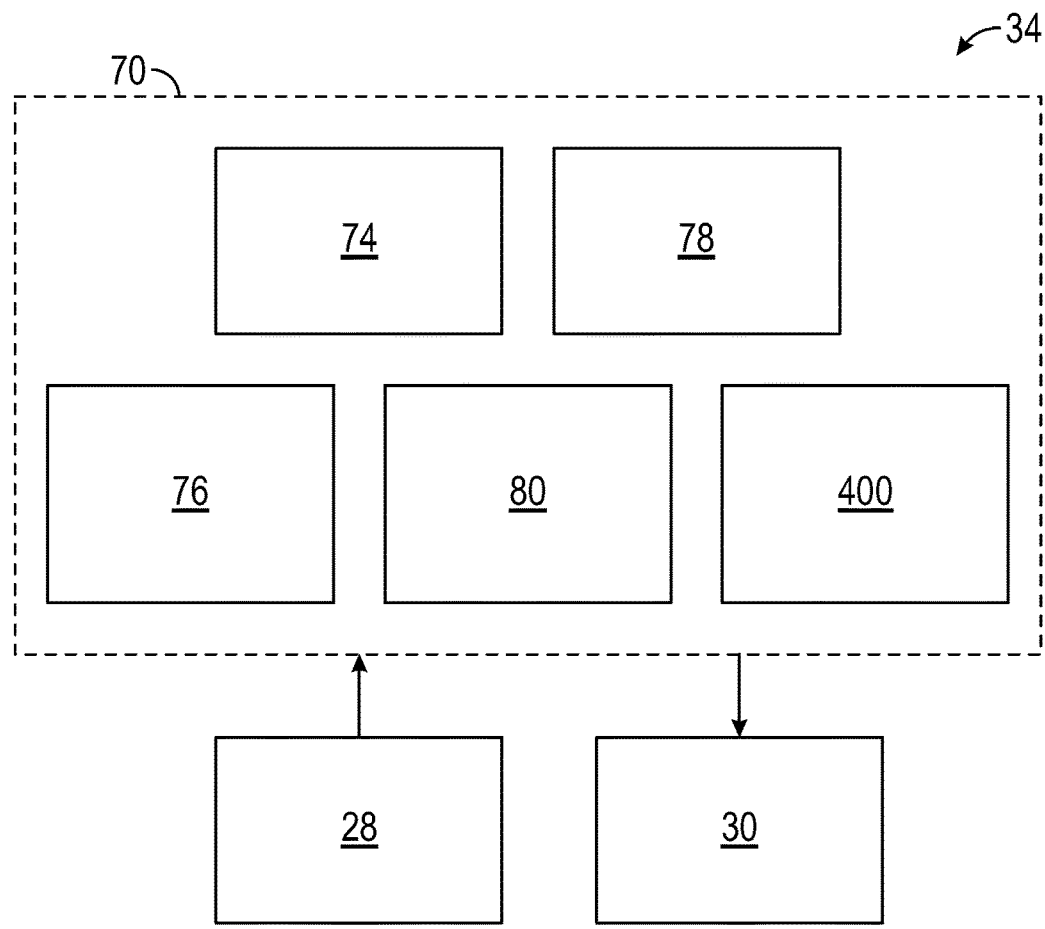
FIG. 3 is functional block diagram illustrating an autonomous driving system (ADS) having a lane change planning system associated with the vehicle of FIG. 1, in accordance with various embodiments.

In accordance with various embodiments, the controller 34 implements an autonomous driving system (ADS) as shown in FIG. 3. That is, suitable software and/or hardware components of the controller 34 (e.g., processor 44 and computer-readable storage device 46) are utilized to provide an ADS that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, and the like) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, as discussed above with regard to FIG. 1, one or more instructions of the controller 34 are embodied in the lane change planning system 100, for planning a corridor for the vehicle 10 to travel along a roadway. All or parts of the lane change planning system 100 may be embodied in the computer vision system 74, and/or the vehicle control system 80 or may be implemented as a separate system (referred to as a lane change planning system 400), as shown.

Figure 4:
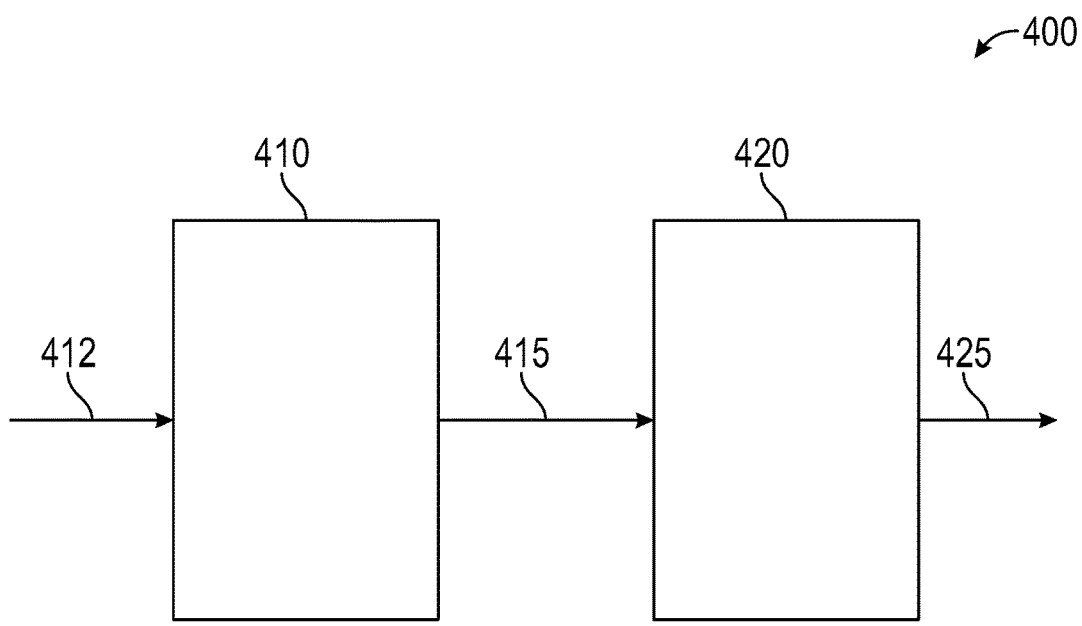
FIG. 4 is a functional block diagram illustrating the lane change planning system, in accordance with various embodiments.

Referring to FIG. 4 and with continued reference to FIG. 1, the lane change planning system 400 generally includes a detection module 410 and a processing module 420. In various embodiments, the detection module 410 and the processing module 420 are disposed onboard the vehicle 10. As can be appreciated, in various embodiments, parts of the lane change planning system 400 may be disposed on a system remote from the vehicle 10 while other parts of the lane change planning system 400 may be disposed on the vehicle 10.

In various embodiments, the detection module 410 receives sensor data 412 from various sensors 40a-40n of the vehicle 10 (e.g., lidar sensors, radar sensors, cameras, and so on). The detection module 410 gathers the sensor data 412 in order to obtain information pertaining to a roadway on which the vehicle 10 is travelling, including conditions that may require an urgent lane change (e.g., when the vehicle 10 is approaching a freeway exit and is not presently in an exit lane, and/or when a current lane of travel for the vehicle 10 is ending and the vehicle 10 needs to merge into another lane, in a dense traffic environment), as well as target vehicles in proximity to the vehicle 10 and/or the lanes of the roadway. In various embodiments, the sensor data 412 is obtained via the sensors 40a-40n of FIG. 1. In various embodiments, the sensor data 412 may include, among other data, lane data as well as a position for each of the detected vehicles (or other objects) as well as information as to whether the target vehicle is moving, and, if so, a direction and magnitude of the movement, among other possible information. In various embodiments, the detection module 410 gathers this information and generates observational data 415 as outputs for the detection module 410, which are provided to the processing module 420 described below.

The processing module 420 receives the observational data 415 from the detection module 410, performs analysis using the received observational data 415, including the identification of the need for the urgent lane change as well as the plan for the urgent lane change (including the selection of an optimal lane change time, having an associated lane change gap, based on a simulation of the vehicle's environment at multiple points in time and an analysis of costs of different potential lane change gaps for the urgent lane change for the vehicle 10). Also in various embodiments, the processing module 420 generates instructions 425 as appropriate for operation of the vehicle 10 for executing an urgent lane change in respect to the analysis. For example, in various embodiments, the processing module 420 selects an optimal time and trajectory for the urgent lane change. Also in various embodiments, the processing module 420 generates instructions 425 for operation of the vehicle 10 to execute the optimal lane change (e.g., for implementation via an automatic driving system, such as the ADS 70 of FIG. 3, and/or components thereof, and/or vehicle actuators, such as the actuators 42a . . . 42n of FIG. 1).

Figure 5:
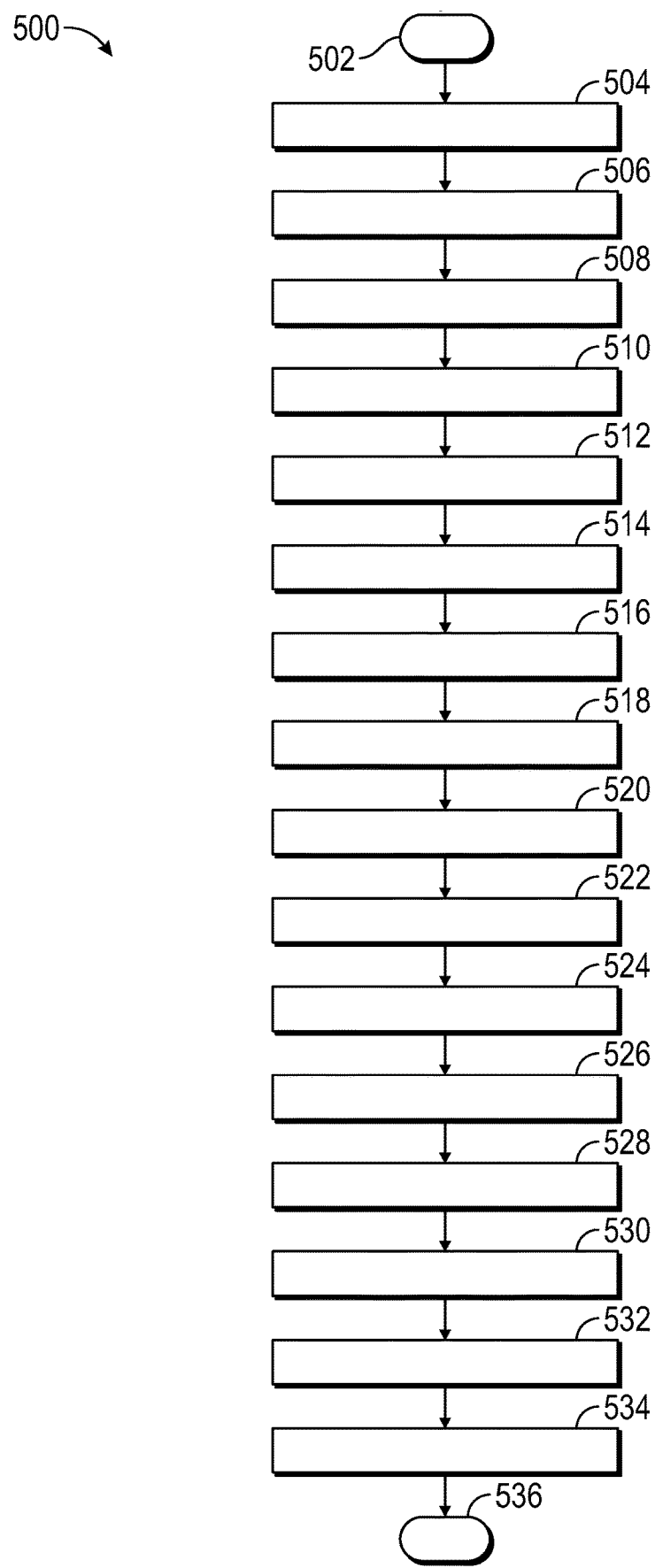
FIG. 5 is a flowchart for a control process for planning an urgent lane change for a vehicle, in accordance with various embodiments.

With reference to FIG. 5, a flowchart is provided for a control process 500 for planning an urgent lane change along a roadway. In accordance with various embodiments, the control process 500 can be implemented in connection with the lane change planning system 100 and vehicle 10 of FIG. 1, the transportation system 52 of FIG. 2, the autonomous driving system of FIG. 3, and the lane change planning system 400 of FIG. 4.

As can be appreciated in light of the disclosure, the order of operation within the control process 500 is not limited to the sequential execution as illustrated in FIG. 5, but may be performed in one or more varying orders as applicable and in accordance with the present disclosure. In various embodiments, the control process 500 can be scheduled to run based on one or more predetermined events, and/or can run continuously during operation of the vehicle 10.

Figure 6:
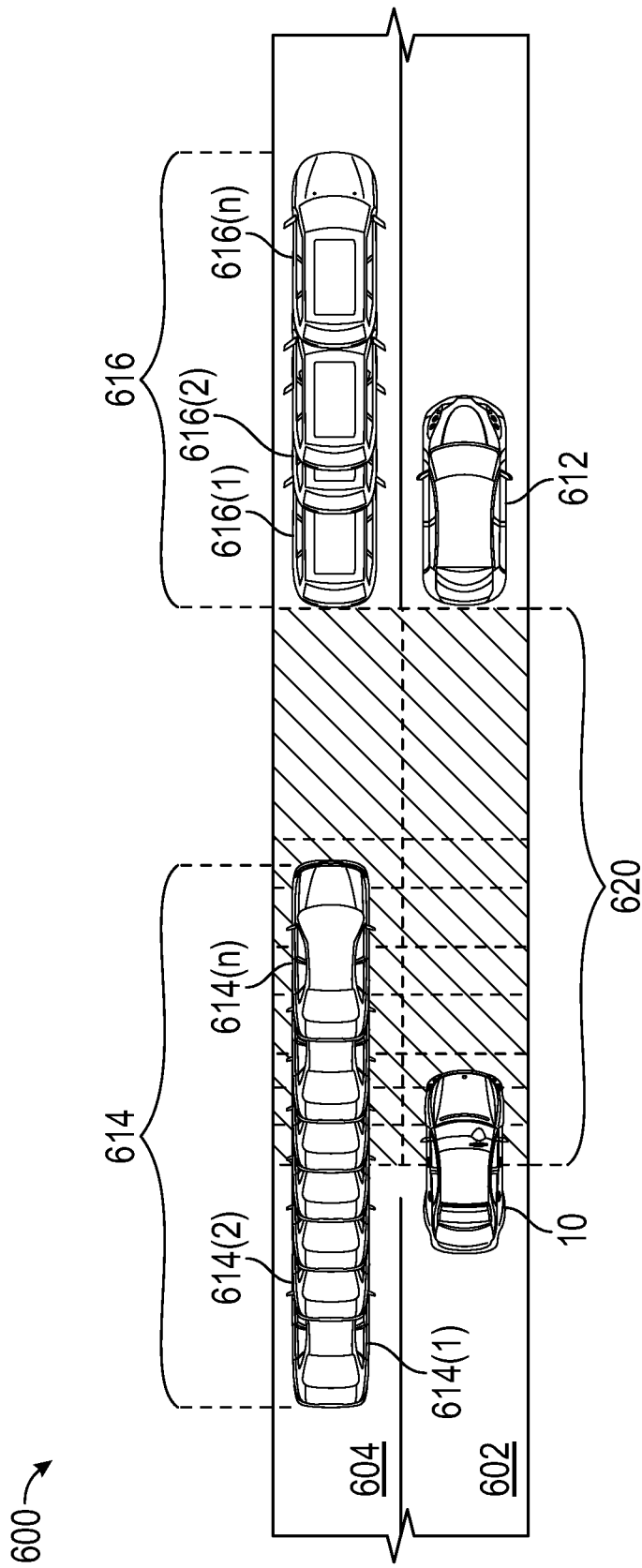
FIG. 6 is a schematic diagram of the vehicle of FIG. 1 on a roadway shared with other vehicles, in which an urgent lane change is needed, in accordance with various embodiments.
Figure 7:
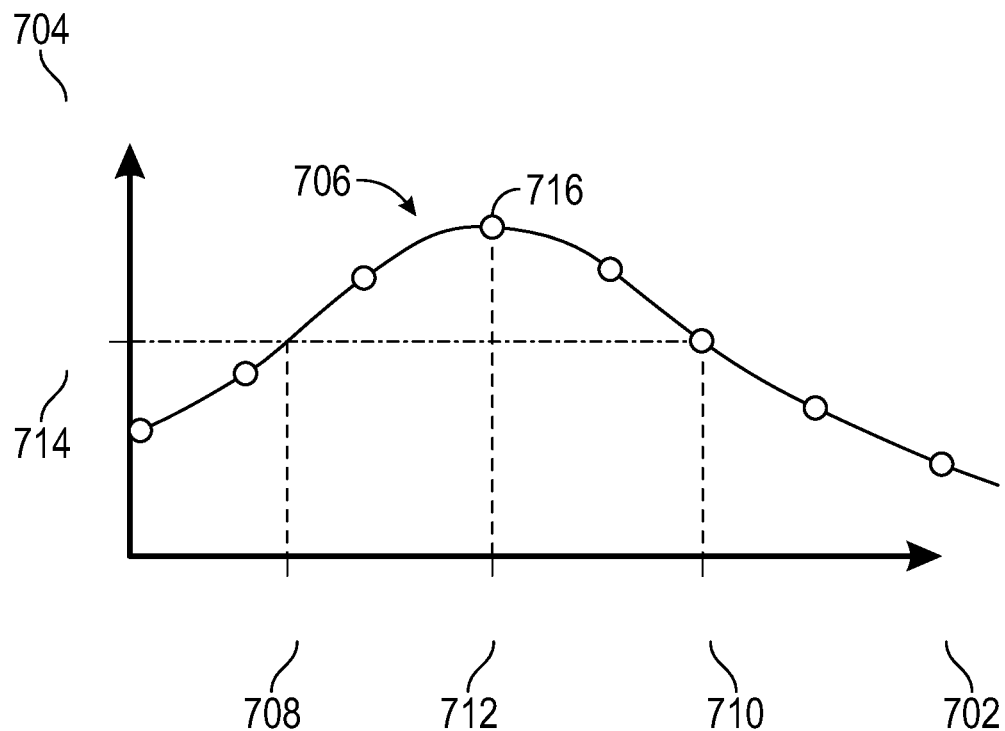
FIGS. 7 and 8 are exemplary plots showing the calculation and usage of an optimal time for executing an urgent lane change for the vehicle of FIG. 1 and the roadway of FIG. 6, in accordance with exemplary embodiments.
Figure 8:
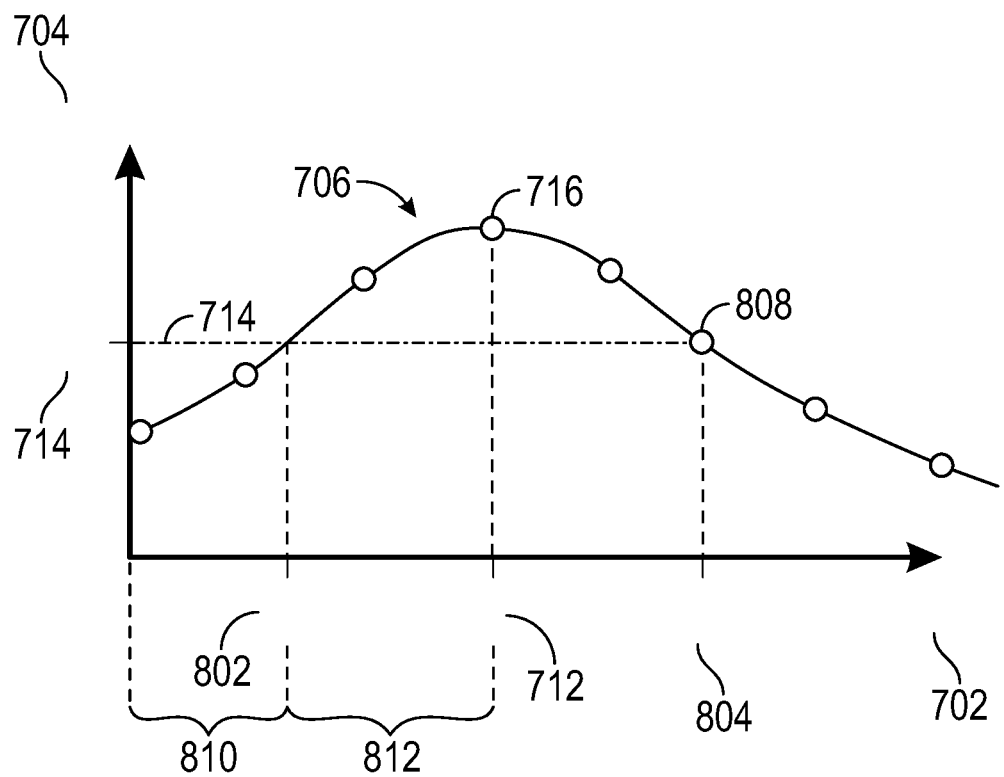

The process 500 of FIG. 5 will also be discussed further below with reference to FIGS. 6-10. Specifically, FIG. 6 is a schematic diagram of the vehicle 10 of FIG. 1 on a roadway 600 shared with other vehicles, in which an urgent lane change is needed, in accordance with various embodiments. FIGS. 7 and 8 are exemplary plots showing the calculation and usage of an optimal time for executing an urgent lane change for the vehicle 10 of FIG. 1 and the roadway 600 of FIG. 6, in accordance with exemplary embodiments. FIGS. 9 and 10 are schematic diagrams showing the determination of an optimal gap for executing the urgent lane change for the vehicle 10 of FIG. 1 and the roadway 600 of FIG. 6, and utilizing the optimal time of FIGS. 7 and 8, in accordance with exemplary embodiments.

With reference back to FIG. 5, in various embodiments the control process 500 may begin at 502. In various embodiments, process step 502 occurs when an occupant is within the vehicle 10 and the vehicle 10 begins operation in an automated or non-automated manner.

In certain embodiments, passenger inputs are obtained at 504. In various embodiments, the passenger inputs pertain to a desired destination for travel via the vehicle 10. In various embodiments, the user inputs may be obtained via an input device of the vehicle (e.g., corresponding to the input device 21 of FIG. 1) and/or a passenger device (e.g., the user device 54 of FIG. 2). Also in certain embodiments, the passenger inputs are obtained via the detection module 410 of FIG. 4. In certain other embodiments, passenger inputs may not be needed (e.g., in the case of fully autonomous vehicles).

Sensor data is obtained at 506. In various embodiments, sensor data is obtained from the various sensors 40a . . . 40n of FIG. 1. For example, in various embodiments, sensor data is obtained from cameras and/or other visions systems, lidar sensors, radar sensors, and/or one or more other sensors 40a . . . 40n of FIG. 1. Also in various embodiments, the sensor data may pertain to data observations pertaining to surroundings for the vehicle 10 as it travels along a roadway (e.g., roadway 600 of FIGS. 6, 9, and 10), including information as to the roadway 600 itself (e.g., its lanes and changes therein, along with width, length, curvature, and so on) as well as other vehicles and other objects that are also utilizing the roadway 600. Also in certain embodiments, the sensor data of 606 is obtained via the detection module 410 of FIG. 4 as sensor data 412 of FIG. 4, and corresponding outputs are provided as observational data 415 to the processing module 420 for processing.

Map data is obtained at 508. In various embodiments, map data is retrieved from a memory, such as the data storage devices 32 and/or 46 of FIG. 1, onboard the vehicle 10. In certain embodiments, the map data may be retrieved from the route database 53 of the autonomous vehicle based remote transportation system 52 of FIG. 2. Also in various embodiments, the map data comprises maps and associated data pertaining to the roadway 600 of FIGS. 6, 9, and 10 on which the vehicle 10 is traveling. Also in certain embodiments, the map data is obtained via the detection module 410 of FIG. 4.

In various embodiments, other data is obtained at 510. In various embodiments, the other data is obtained at 510 via the communication system 36 of FIG. 1 (e.g., from a transceiver thereof) from or utilizing one or more remote data sources. By way of example, in certain embodiments, the other data of 510 may include GPS data using one or more GPS satellites, including the present location of the vehicle 10; data regarding applicable traffic flows and patterns for the roadway; traffic light histories, histories of movement of nearby stationary vehicles, and/or weather, construction, and/or other data from one or more remote sources that may have an impact on the analysis of the roadway, including as to whether an urgent lane change is necessary.

A current location of the vehicle is determined at 512. In various embodiments, the current location is determined by the processing module 420 of FIG. 4 (e.g., using processor 44 of FIG. 1) using information obtained from 504, 506, 508 and/or 510. For example, in certain embodiments, the current location is determined using a GPS and/or other location system, and/or is received from such system. In certain other embodiments, the location may be determined using other sensor data from the vehicle and/or via inputs provided by a user or passenger of the vehicle 10.

Identifications are made at 514 as to other vehicles that are sharing the roadway with the vehicle 10. In various embodiments, the processor 44 of FIG. 1 identifies other vehicles (e.g., other vehicles 612, 614, 616, 1018, and 1020 of FIGS. 6, 9, and 10) that are along the roadway 600. In various other embodiments, other objects (e.g., trees, rocks, walls, and so on) may also be detected. In various embodiments, the identifications of 514 are made by the processing module 420 of FIG. 4 (e.g., via the processor 44 of FIG. 1) using the observational data 415 from the detection module 410 from 506.

A determination is made at 516 as to an urgent lane change. In various embodiments, an urgent lane change is determined, based on the sensor data of 506, map data of 508, other data of 510 (if applicable), location data of 512, and other vehicle data of 514, as to when an imminent lane change is needed for the vehicle 10 to maintain its intended course of travel. In various embodiments, an urgent lane change is determined to be needed when either (a) the vehicle 10 is approaching a freeway exit and is not presently in an exit lane, and/or (b) when a current lane of travel for the vehicle 10 is ending and the vehicle 10 needs to merge into another lane, provided that the vehicle 10 is in a dense traffic environment. For example, in certain embodiments, an urgent lane change is determined to be needed when either (a) the vehicle 10 is approaching a freeway exit within a first predetermined distance or time and is not presently in an exit lane, and/or (b) a current lane of travel for the vehicle 10 is ending within a second predetermined distance or time and the vehicle 10 needs to merge into another lane, provided that at least a predetermined number of vehicles 10 are detected along the roadway in proximity to the vehicle 10. In various embodiments, the determination of 516 is made by the processing module 420 of FIG. 4 (e.g., via the processor 44 of FIG. 1) using the observational data 415 from the detection module 410.

With reference to FIG. 6, in the exemplary roadway 600 depicted therein, the vehicle 10 is depicted as being currently located in a first lane (or current lane) 602. Also as depicted in FIG. 6, in various embodiments, the urgent lane change is for the vehicle 10 to move into a second lane (or target lane) 604 of the roadway. Also as depicted in FIG. 6, various other vehicles 612, 614, and 616 (the number of other vehicles may vary under different circumstances) are identified as potentially posing a hindrance and/or interfering with the desired lane change into the second lane 604.

With reference back to FIG. 5, once the urgent lane change is determined, current gaps for the urgent lane change are identified and predicted in future time at 518. Each gap is determined as the space between the host vehicle and remote vehicles on the target lane, and the leading vehicle in the current lane. FIG. 6 depicts one of the current gaps for the urgent lane change maneuver defined by the space between host vehicle 10 and remote vehicles 612, 614, 616. In various embodiments, each current is predicted in time with respect to a horizontal axis of the host vehicle 10 and/or roadway 600 at a current time (t=0) as well as subsequent points in time using a time step interval (e.g., t=0.5, t=1, t=2, representing seconds, milliseconds, and/or other units of measure of time, and so on). In various embodiments, as part of 518, current and future predicted positions and trajectories for each of the detected vehicles are used to determine the current gap size at various future points in time. Future predicted positions, headings, velocities, and accelerations (including magnitudes and directions thereof) are determined for each of the target vehicles, including considerations of interactions with each other and with the host vehicle 10 (e.g., taking into account the changes that movement of one vehicle may have on the movement of another vehicle in response, and so on).

With reference to FIG. 6, in various embodiments, various predicted gaps 620 are depicted at various points in time (t) as shaded regions in the roadway 600 of FIG. 6. In certain embodiments, each predicted gap exists at a particular point in time, and represents a region between different other vehicles (e.g., vehicles 612, 614, 616, and so on) in the current lane 602 and target lane 604 through which the target vehicle 10 may execute the desired lane change into the target lane 604. Also as shown in FIG. 6, the predicted gaps 620 are identified based on different positions of the other vehicles over time (e.g., different positions 612(1), 612(2), . . . 612(n) of other vehicle 612 at different corresponding different points in time 1, 2 . . . n; along with different positions 614(1), 614(2), . . . 614(n) of other vehicle 614 at different corresponding different points in time 1, 2 . . . n; and along with different positions 616(1), 616(2), . . . 616(n) of other vehicle 616 at different corresponding different points in time 1, 2 . . . n; in which "n" denotes the number of points in time utilized in the analysis, and so on). Also in various embodiments, a gap function Gap (t) is defined by the intersecting area between the current lane 602 and the target lane 604 created by the detected other vehicles in the current lane 602 and the target lane 604. While FIG. 6 depicts the process of analyzing a single gap, it will be appreciated that the same process would be repeated for each of the gaps in various embodiments (e.g., as depicted in FIG. 10, discussed further below). In various embodiments, the determinations and predictions of 518 are made by the processing module 420 of FIG. 4 (e.g., via the processor 44 of FIG. 1).

In addition, in various embodiments, once the predicted gaps are identified, an evaluation function is created at 520 for each of the predicted gaps. In various embodiments, for each predicted gap, the respective evaluation function represents a size (e.g. a length along a horizontal axis with respect to the host vehicle 10) of the gap over time (e.g., beginning with a present time, $T_0$).

In certain embodiments, the evaluation function for each gap is created by the processing module 420 of FIG. 4 (e.g., via the processor 44 of FIG. 1) as follows:

$$U_{gap,i}(t) = w_1 \text{Gap}_i(t-T) + w_2 \text{Gap}_i(t) + w_3 \text{Gap}_i(t+T) \quad \text{(Equation 1),}$$

in which $U_{gap,i}(t)$ represents the size (U) of each predicted gap (i) at a particular time (t); $w_1$, $w_2$, and $w_3$ represent weighting factors; and T represents a time interval for obtaining an average of gap size values including the present time (t) as well as an immediately preceding time (t−T) and an immediately succeeding time (t+T).

Also in various embodiments, at 522, an optimal time (T*), among all predicted gap times, is determined for each gap, using the respective evaluation function for the gap. Specifically, in certain embodiments, the processing module 420 of FIG. 4 (e.g., via the processor 44 of FIG. 1) determines the optimal time (T*) for the host vehicle 10 to make the desired lane change utilizing the particular gap. In certain embodiments, for each particular gap, the optimal time (T*) represents the time in which the particular gap will have its largest size calculated in Equation 1.

With reference to FIG. 7, an exemplary plot is provided showing, for a particular gap, the predicted gap size 704 (the y-axis) over time 702 (the x-axis), in exemplary embodiments. As shown in FIG. 7, the gap size 704 over time 702 is reflected by a curve 706 representing the function of Equation 1 above. As shown in FIG. 7, the optimal time (T*) 712 for the particular gap of FIG. 7 corresponds to the maximum (i.e., largest) gap size 716.

In addition, also in certain embodiments, the plot includes a $g_{min}$ value 714 (representing a minimum gap size for the vehicle 10 to safely pass through in executing the lane change) and $t_{min}$ 708 value (representing an earliest feasible time in which the lane change can be made), and a $t_{max}$ 710 value (representing a latest feasible time in which the lane change can be made). $t_{min}$ and $t_{max}$ values correspond to the $g_{min}$ value and are determined as the x-axis values where the gap size curve 706 has the value of $g_{min}$ on the y-axis. Accordingly, in such embodiments, the optimal time (T*) is greater than or equal to $t_{min}$ and less than or equal to $t_{max}$, and must have a gap size that is greater than or equal to $g_{min}$. While FIG. 7 depicts the process of analyzing a single gap, it will be appreciated that the same process would be repeated for each of the gaps in various embodiments (e.g., as depicted in FIG. 10, discussed further below).

Also in various embodiments, at 524, for each gap, the vehicle maneuver is split into two components, namely, a lane keep component and a lane change component (for example, for further analysis, such as with respect to trajectory and cost, as discussed further below). In various embodiments, the lane keep component comprises a first vehicle action while keeping in the current lane, prior to executing the lane change. Also in various embodiments, the lane change component comprises a second vehicle action while executing the lane change into the desired lane. In various embodiments, the splitting of the vehicle maneuver in this manner is performed by the processing module 420 of FIG. 4 (e.g., via the processor 44 of FIG. 1).

With reference to FIG. 8, in various embodiments: (i) a lane keep region 810 is depicted which starts from the current time t0 and ends at the lane keep time $T_{LK}$ 802 (in certain embodiments, also corresponding to $t_{min}$ 708 of FIG. 7); and (ii) a lane change region 812 is depicted which starts right after the lane keep region at $T_{LK}$ 802 and ends at the optimal time T* 712. To ensure safety and robustness to the uncertainties in the detection and future prediction of the other vehicles, the lane keep region may end after $T_{LK}$ 802 and lane change region may end after T* 712 but before a maximum lane change time $t_{LC}$ (in certain embodiments, also corresponding to $t_{max}$ 708 of FIG. 7). Also as shown in FIG. 8 and noted above, the gap size must be greater than or equal to $g_{min}$ 714 for the vehicle 10 to safely execute the desired lane change. While FIG. 8 depicts the process of analyzing a single gap, it will be appreciated that the same process would be repeated for each of the gaps in various embodiments (e.g., as depicted in FIG. 10, discussed further below).

With reference back to FIG. 5, in various embodiments, at 526, a trajectory is generated for each of the gaps. In various embodiments, for each gap, the trajectory represents the planned motion of the vehicle 10, including both the lane keep and lane change components. In various embodiments, the processing module 420 of FIG. 4 (e.g., via the processor 44 of FIG. 1) generates the trajectory for each gap on the target lane for the vehicle 10 which completes the lane keep and lane change maneuvers within the specified regions and satisfies the terminal constraints at the end of lane changes at target time T* (for example, the required velocity and acceleration of the host 10 to smoothly follow the lead vehicle on target lane after completing the lane change maneuver).

With reference to FIG. 9, an illustration is provided of the vehicle 10 along the roadway 600 with a planned trajectory, in accordance with various embodiments. For example, as shown in FIG. 9, in certain embodiments, a trajectory 904 is planned for the host vehicle 10 in travelling from the current lane 602 to the desired lane 604 via a depicted gap 902, including a lane keep component 910 (in certain embodiments, corresponding to the lane keep component time 810 of FIG. 8) and a lane change component 912 (in certain embodiments, corresponding to the lane change component time 812 of FIG. 8). Also as shown in FIG. 9, in this example, the host vehicle 10 is able to successfully navigate the desired lane change via the trajectory 904, using the gap 902, without contacting any of the surrounding target vehicles 612, 614, or 616. While FIG. 9 depicts the process of analyzing a single gap, it will be appreciated that the same process would be repeated for each of the gaps in various embodiments (e.g., as depicted in FIG. 10, discussed further below).

With reference back to FIG. 5, in various embodiments, at 528, a cost value is calculated for each trajectory (i.e., corresponding to each gap). In various embodiments, for each trajectory, the cost value comprises a measure of aggressiveness of the maneuver (e.g., in terms of lateral and/or longitudinal acceleration and/or jerk), along with an amount of time to reach the desired lane and a closest distance to other vehicles during the entirety of the maneuver. For example, in various embodiments: (i) trajectories with relatively greater lateral and/or longitudinal acceleration and/or jerk values (e.g., above one or more predetermined thresholds) would result in relatively larger costs; (ii) trajectories with relatively larger times to reach the desired lane would result in relatively larger costs; (iii) trajectories with relatively smaller distances with other vehicles or objects (e.g., having a relatively smaller closest distance throughout the entirety of the maneuver) would also result in relatively larger costs. In various embodiments, the processing module 420 of FIG. 4 (e.g., via the processor 44 of FIG. 1) calculates the costs for the different trajectory based on the planned trajectory and predicted movement of the various vehicles, and utilizes weights for the various cost factors based on their relative importance, and so on. In addition, in various embodiments, the calculated cost for each trajectory (and associated gap) comprises a calculated total cost for the entirety of the trajectory, including respective costs of both the lane keeping component and the lane changing component of the trajectory.

Also in various embodiments, the optimal gap is determined at 530. In certain embodiments, the processing module 420 of FIG. 4 (e.g., via the processor 44 of FIG. 1) selects the gap for the desired lane change with the lowest trajectory cost value, based on the calculations of 528.

With reference to FIG. 10, an illustration is provided of the vehicle 10 along the roadway 600 with multiple projected trajectories, in accordance with various embodiments. Various possible gaps 902(1), 902(2), and 902(n) are depicted in FIG. 10, each for executing the desired lane change for the host vehicle 10 into the desired lane 604, while avoiding other vehicles 614, 616, 1018, and 1020. It will be appreciated that in various embodiments, the number of gaps 902 may vary (depending on circumstances, and so on), as may the number of target vehicles and/or other conditions pertaining to FIG. 10. As shown in FIG. 10, each gap 902(1), 902(2), . . . 902(n) has a respective trajectory 904(1), 904(2), . . . 904(n), with an associated respective cost, and the processor 44 of FIG. 1, at 530, selects the gap 902 and corresponding trajectory 904 with the minimized cost value.

In various embodiments, at 532, the trajectory is planned for the vehicle 10 in accordance with the optimized (i.e., lowest cost) gap. In various embodiments, the processing module 420 of FIG. 4 (e.g., via the processor 44 of FIG. 1) plans the trajectory with the lowest/minimized cost, and transmits instructions for the selected trajectory. Also in various embodiments, the lane change is executed for the vehicle 10 at 534, in accordance with implementation of the instructions provided by the processor 44 to one or more systems of FIG. 1, such as implementation by the actuator system 30 (and/or, in certain embodiments, the propulsion system 20, transmission system 22, steering system 24, brake system 26, and/or other systems and/or components of FIG. 1). Also in various embodiments, the process then terminates at 536.

As referred to herein, unless otherwise noted: (i) a current gap as used herein refers to gaps which are identified based on the current location of the host and remote vehicles (e.g., FIG. 10 depicts three current gaps, while the other Figures each depict only a single current gap); (ii) predicted gaps (e.g., a plurality of predicted gaps) as used herein refer to gaps generated based on the prediction of the remote vehicles, for each current gap (e.g., each current gap can have multiple predicted gaps as shown in FIG. 6); and (iii) optimal time, trajectory and cost values are determined once for each current gap based on its predicted gaps (e.g., in FIG. 10, in which there are three current gaps, the calculations will determine three optimal times, three trajectories, and three cost values, and the optimal gap is the one which has the minimum cost among three costs), in various embodiments.

Accordingly, in various embodiments, methods, systems, and vehicles are provided for the execution of an urgent lane change for a vehicle, such as an autonomous vehicle. As set forth in greater detail above, in various embodiments, (i) For each current gap, various predicted gaps for the desired lane change are generated based on actual and predicted positions and movement of the host vehicle and surrounding target vehicles; (ii) a trajectory and associated cost is generated for each current gap and based on its predicted optimal gap size; and (iii) the lane change is executed based on a selected gap (with an associated trajectory) that has a minimum cost value (e.g., that results in a relatively larger distance between target vehicles while achieving the desired lane change in a relatively smaller amount of time with a relatively smaller degree of maneuver aggressiveness, and so on, as described above).

It will be appreciated that, in various embodiments, the vehicles, systems, and components depicted in the drawings and described above may vary. It will similarly be appreciated that the steps, implementations, and examples depicted in the drawings and described above may also vary, and/or may be performed in a different order or sequence, and so on.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for executing a lane change for a host vehicle, the method comprising:

obtaining, via one or more sensors, sensor data pertaining to target vehicles in proximity to the host vehicle;

obtaining, via a processor using the sensor data, predictions as to future positions and movement of the target vehicle;

obtaining map data pertaining to a roadway on which the host vehicle is travelling;

determining, via the processor using the map data, whether the lane change is to be performed within a predetermined amount of time;

identifying, via the processor, a plurality of gaps through which the host vehicle may accomplish the lane change, based on the predictions;

calculating, via the processor, a cost for each of the plurality of gaps;

selecting, via the processor, an optimal gap of the plurality of gaps, having a minimized cost; and executing the lane change for the host vehicle via the selected gap, via instructions provided by the processor;

wherein the steps of identifying the plurality of gaps, calculating the cost, selecting the optimal gap, and executing the lane change are performed only on a further condition that the lane change is determined to be performed within the predetermined amount of time.

2. The method of claim 1, further comprising:
determining, via the processor, for each of the plurality of gaps, a respective trajectory for the host vehicle to travel to execute the lane change;
wherein:
the step of calculating the cost for each of the plurality of gaps comprises calculating a respective cost for each trajectory of the plurality of gaps;
the step of selecting the optimal gap comprises selecting an optimal trajectory for one of the plurality of gaps, having the minimized cost; and
the step of executing the lane change comprises executing the optimal trajectory for the host vehicle, via instructions provided by the processor.

3. The method of claim 2, further comprising:
determining, via the processor, for each of the plurality of gaps, an optimized time for execution of the lane change utilizing the gap that maximizes a size of the gap, subject to a minimum gap size for lane change and a corresponding minimum time and maximum time for the lane change;
wherein the step of determining the respective trajectory comprises, for each of the plurality of gaps, determining the respective trajectory that executes the lane change using the gap at the optimized time for that gap.

4. The method of claim 2, further comprising:
for each of the gaps and its corresponding trajectory:
dividing the trajectory into a lane keeping component and a lane changing component; and
calculating a total cost for the trajectory to include respective costs of both the lane keeping component and the lane changing component;
wherein the step of selecting the optimal trajectory is based on minimizing the total cost.

5. The method of claim 2, wherein the step of calculating the cost for each trajectory comprises calculating the cost based on a measure of aggressiveness of a maneuver, an amount of time to reach the desired lane, and a closest distance to other vehicles during an entirety of the maneuver.

6. The method of claim 5, wherein the measure of aggressiveness includes measures of lateral acceleration, longitudinal acceleration, lateral jerk, and longitudinal jerk.

7. The method of claim 1, wherein the method is implemented in an autonomous vehicle.

8. A system comprising:
one or more sensors configured to obtain sensor data pertaining to target vehicles in proximity to a host vehicle; and
a processor coupled to the one or more sensors and configured to at least facilitate:
obtaining predictions as to future positions and movement of the target vehicle;
obtaining map data pertaining to a roadway on which the host vehicle is travelling;
determining, using the map data, whether a lane change is to be performed within a predetermined amount of time;
identifying a plurality of gaps through which the host vehicle may accomplish the lane change, based on the predictions;
calculating a cost for each of the plurality of gaps;
selecting an optimal gap, having a minimized cost; and
providing instructions for executing the lane change for the host vehicle;
wherein the calculating the cost, selecting the optimal gap, and providing the instructions for executing the lane change are performed only on further conditions that the lane change is determined to be performed within the predetermined amount of time.

9. The system of claim 8, wherein the processor is further configured to at least facilitate:
determining, for each of the plurality of gaps, a respective trajectory for the host vehicle to travel to execute the lane change;
calculating a respective cost for each trajectory of the plurality of gaps;
selecting an optimal trajectory for one of the plurality of gaps, having the minimized cost; and
providing instructions for executing the optimal trajectory for the host vehicle.

10. The system of claim 9, wherein the processor is further configured to at least facilitate:
determining, for each of the plurality of gaps, an optimal time for execution of the lane change utilizing the gap that maximizes a size of the gap, subject to a minimum gap size for lane change and a corresponding minimum time and maximum time for the lane change; and
for each of the plurality of gaps, selecting the respective trajectory that executes the lane change using the gap at the optimized time for that gap.

11. The system of claim 9, wherein the processor is further configured to at least facilitate:
for each of the gaps and its corresponding trajectory:
dividing the trajectory into a lane keeping component and a lane changing component; and
calculating a total cost for the trajectory to include respective costs of both the lane keeping component and the lane changing component; and
selecting the optimal trajectory based on minimizing the total cost.

12. The system of claim 9, wherein the processor is further configured to at least facilitate calculating the cost based on a measure of aggressiveness of a maneuver, an amount of time to reach the desired lane, and a closest distance to other vehicles during an entirety of the maneuver.

13. An autonomous vehicle comprising:
one or more sensors configured to obtain sensor data pertaining to target vehicles in proximity to the autonomous vehicle;
a processor coupled to the one or more sensors and configured to at least facilitate:
obtaining predictions as to future positions and movement of the target vehicle;
obtaining map data pertaining to a roadway on which the host vehicle is travelling;
determining, using the map data, whether a lane change is to be performed within a predetermined amount of time;
identifying a plurality of gaps through which the autonomous vehicle may accomplish the lane change, based on the predictions;
calculating a cost for each of the gaps;
selecting an optimal gap, having a minimized cost; and
providing instructions for executing the lane change for the autonomous vehicle;
wherein the calculating the cost, selecting the optimal gap, and providing the instructions for executing the lane change are performed only on further conditions that the lane change is determined to be performed within the predetermined amount of time; and a vehicle actuator system coupled to the processor and configured to implement the lane change in accordance with the instructions provided by the processor.

14. The autonomous vehicle of claim 13, wherein the processor is further configured to at least facilitate:

determining, for each of the gaps, a respective trajectory for the autonomous vehicle to travel to execute the lane change;

calculating a respective cost for each trajectory;

selecting an optimal trajectory for one of the gaps, having the minimized cost; and providing instructions to the actuator system for executing the optimal trajectory for the autonomous vehicle.

15. The autonomous vehicle of claim 14, wherein the processor is further configured to at least facilitate:

determining, for each of the gaps, an optimal time for execution of the lane change utilizing the gap that maximizes a size of the gap, subject to a minimum gap size for lane change and a corresponding minimum time and maximum time for the lane change; and for each of the gaps, selecting the respective trajectory that executes the lane change using the gap at the optimized time for that gap.

16. The autonomous vehicle of claim 14, wherein the processor is further configured to at least facilitate:

for each of the gaps and its corresponding trajectory:

dividing the trajectory into a lane keeping component and a lane changing component; and calculating a total cost for the trajectory to include respective costs of both the lane keeping component and the lane changing component; and selecting the optimal trajectory based on minimizing the total cost.

17. The autonomous vehicle of claim 14, wherein the processor is further configured to at least facilitate calculating the cost based on a measure of aggressiveness of a maneuver, an amount of time to reach the desired lane, and a closest distance to other vehicles during an entirety of the maneuver.

* * * * *